(12) United States Patent
Senga et al.

(10) Patent No.: US 8,585,395 B2
(45) Date of Patent: Nov. 19, 2013

(54) TOGGLE TYPE MOLD CLAMPING DEVICE

(75) Inventors: Masatoshi Senga, Yamanashi (JP); Koichi Nishimura, Yamanashi (JP)

(73) Assignee: FANUC Corporation, Yamanashi (JP)

( * ) Notice: Subject to any disclaimer, the term of this patent is extended or adjusted under 35 U.S.C. 154(b) by 0 days.

(21) Appl. No.: 13/442,022

(22) Filed: Apr. 9, 2012

(65) Prior Publication Data

US 2012/0288584 A1    Nov. 15, 2012

(30) Foreign Application Priority Data

May 12, 2011    (JP) .................................. 2011-107489

(51) Int. Cl.
*B29C 45/64*    (2006.01)

(52) U.S. Cl.
USPC .......................... 425/593; 100/283; 425/451.6

(58) Field of Classification Search
USPC ................................ 425/593, 451.6; 100/283
See application file for complete search history.

(56) References Cited

U.S. PATENT DOCUMENTS

| | | | | |
|---|---|---|---|---|
| 5,843,496 A | * | 12/1998 | Ito et al. ......................... | 425/593 |
| 6,345,975 B1 | * | 2/2002 | Wang ............................. | 425/593 |
| 7,182,590 B2 | * | 2/2007 | Nishimura et al. ............ | 425/593 |
| 2005/0181091 A1 | | 8/2005 | Nishimura et al. | |
| 2008/0057146 A1 | | 3/2008 | Nishimura et al. | |

FOREIGN PATENT DOCUMENTS

| | | |
|---|---|---|
| JP | 8-103927 A | 4/1996 |
| JP | 9057805 A | 3/1997 |
| JP | 3072709 U | 11/2000 |
| JP | 3072741 U | 11/2000 |
| JP | 2005-231081 A | 9/2005 |
| JP | 2008-55817 A | 3/2008 |
| JP | 2008290322 A | 12/2008 |

OTHER PUBLICATIONS

A JP Office Action, dated Jul. 10, 2012, issued in JP Application No. 2011-107489.

* cited by examiner

*Primary Examiner* — James MacKey (74) *Attorney, Agent, or Firm* — Lowe Hauptman & Ham, LLP (57) ABSTRACT

In a toggle type mold clamping device including a plurality of link units, a coupling portion of a first link coupled with a toggle driving link is provided on an outer side of an area between a coupling portion of the toggle driving link coupled with a crosshead and a center line of the first link. Furthermore, the first link has a structure in which two members arranged in parallel are coupled and integrated with each other and a space through which the toggle driving link passes is formed between the two coupled members.

4 Claims, 7 Drawing Sheets

<PRIOR ART>

FIG. 10

<PRIOR ART>

TOGGLE TYPE MOLD CLAMPING DEVICE

RELATED APPLICATIONS

The present application is based on, and claims priority from, Japanese Application Number 2011-107489, filed May 12, 2011, the disclosure of which is hereby incorporated by reference herein in its entirety.

BACKGROUND OF THE INVENTION

1. Field of the Invention

The present invention relates to a toggle type mold clamping device used for an injection molding machine and the like.

2. Description of the Related Art

Figure 7:
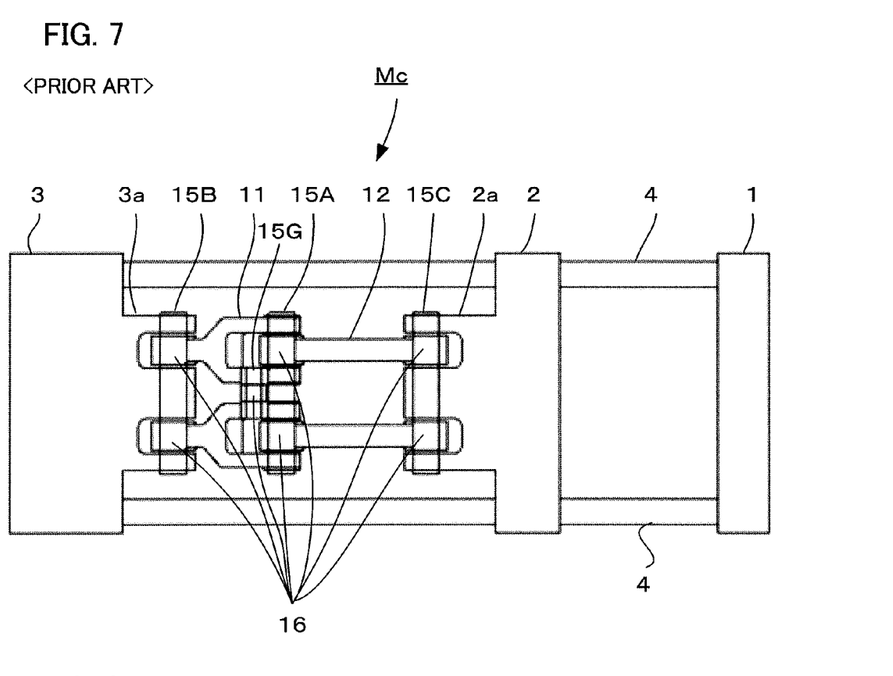
FIG. 7 is a top view of an essential portion of a prior art toggle type mold clamping device.
Figure 8:
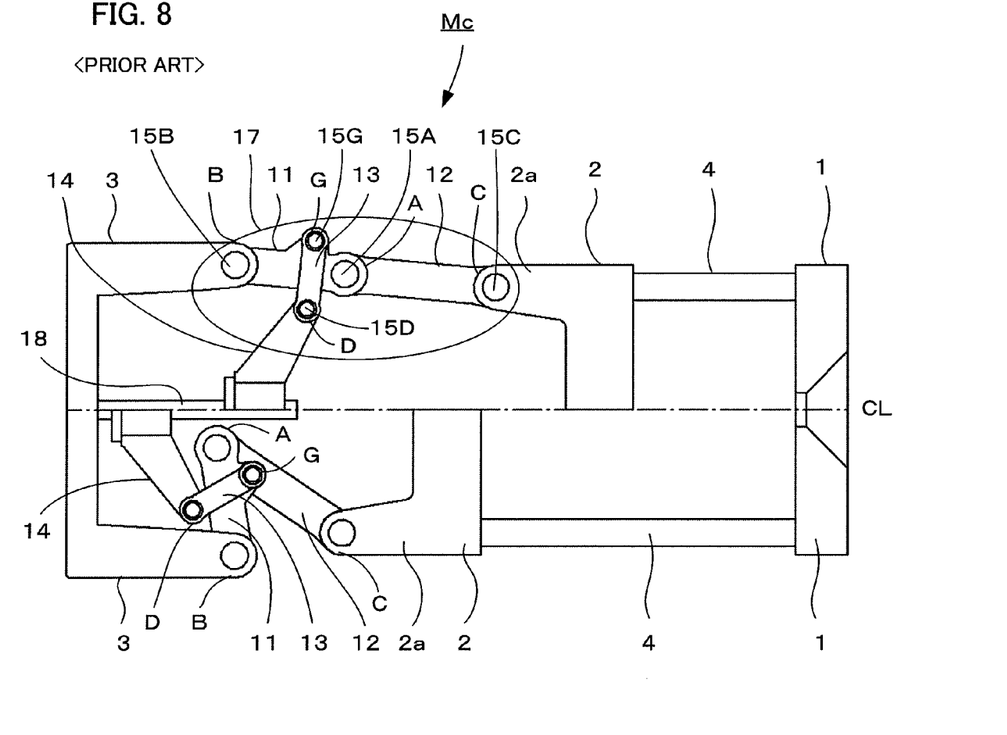
FIG. 8 is a sectional view of an essential portion of the toggle type mold clamping device shown in FIG. 7.

In an injection molding machine, a mold clamping device and an injection machine are installed in a line on a machine base in general. FIG. 7 is a top view showing an essential portion of a prior art mold clamping device Mc disclosed in Japanese Patent Application Laid-Open No. 9-57805 and having link units 17 and FIG. 8 is a sectional view of the essential portion. FIG. 8 is a partially transparent view showing a locked-up state of the mold clamping device Mc on an upper side of a center line CL of the mold clamping device and a maximum mold opening stroke of the mold clamping device Mc on a lower side of the center line CL.

The mold clamping device Mc includes a fixed platen 1, a movable platen 2, and a rear platen 3 in order to open and close a mold. The fixed platen 1 and the rear platen 3 are coupled by a plurality of tie bars 4 and the movable platen 2 moves forward and backward with respect to the fixed platen 1 along the tie bars 4. The movable platen 2 is moved forward and backward by the link units 17 of a mold clamping mechanism driven by a driving motor (not shown).

The link unit 17 includes a first link 11, a second link 12, and a toggle driving link 13. A through hole into which a bushing is inserted is formed in each of opposite ends (one end and the other end) of the first link 11. Furthermore, another through hole is formed at an intermediate position between the through holes in the opposite ends of the first link 11.

A link pin 15B is inserted through through holes formed in protruding portions 3a of the rear platen 3 and is fixed to the protruding portions 3a of the rear platen 3 by a locking screw or the like. The link pin 15B fixed to the protruding portions 3a of the rear platen 3 passes through the bushing inserted into the through hole 16 formed in the one end of the first link 11. As a result, the first link 11 is enabled by the bushing, inserted into the through hole 16 formed in the one end of the first link 11, to rotate about a central axis of the link pin 15B, passing through the bushing, with respect to the protruding portions 3a of the rear platen 3.

A link pin 15A is inserted through the through hole formed in the other end of the first link 11 and is fixed to the other end of the first link 11 by a locking screw or the like. A through hole 16 into which the bushing is inserted is formed in one end of the second link 12. The link pin 15A inserted through the through hole formed in the other end of the first link 11 passes through the bushing inserted into the through hole 16 formed in the one end of the second link 12. As a result, the first link 11 and the second link 12 are enabled by the bushing, inserted into the through holes formed in the other end of the first link 11 and the one end of the second link 12, to rotate with respect to each other about a central axis of the link pin 15A passing through the bushing.

A through hole 16 into which a bushing is inserted is formed in the other end of the second link 12. A link pin 15C is inserted through through holes formed in protruding portions 2a of the movable platen 2 and is fixed to the protruding portions 2a of the movable platen 2 by a locking screw or the like. As a result, the second link 12 is enabled by the bushing, inserted into the through hole 16 formed in the other end of the second link 12, to rotate about a central axis of the link pin 15C, passing through the bushing, with respect to the protruding portions 2a of the movable platen 2.

A through hole 16 into which the bushing is inserted is formed at each of opposite ends of the toggle driving link 13. A link pin 15D is inserted through the bushing inserted into the through hole 16 formed in the one end of the toggle driving link 13. The link pin 15D inserted through the bushing is fixed to one end of a crosshead 14 by a locking screw or the like. By inserting the bushing into the through hole 16 formed in the one end of the toggle driving link 13, the toggle driving link 13 can rotate about the bushing with respect to the crosshead 14. A link pin 15G is inserted through the bushing inserted into the through hole 16 formed in the other end of the toggle driving link 13. The link pin 15G inserted through the bushing is fixed to the intermediate portion of the first link 11 by a locking screw or the like. By inserting the bushing into the through hole 16 formed in the other end of the toggle driving link 13, the toggle driving link 13 and the first link 11 can rotate with respect to each other about a central axis of the link pin 15G passing through the bushing.

Here, portions rotating with respect to each other about the link pin 15A, the link pin 15B, the link pin 15C, the link pin 15D, and the link pin 15G as central axes are referred to as a pivot portion A, a pivot portion B, a pivot portion C, a pivot portion D, and a pivot portion G, respectively. By providing the pivot portion G on an outer side of the first link 11 as viewed from the crosshead 14 and pivotably coupling the toggle driving link 13, it is possible to extend a span of the toggle driving link 13 without considerably displacing the link unit 17 outward away from the crosshead 14 to thereby increase a mold clamping force and prevent increase in a vertical width of the mold clamping device Mc. By providing the pivot portion G of the first link 11 and the toggle driving link 13 on the outer side, it is possible to shorten a moving distance of the crosshead 14 required to move the movable platen 2 a certain distance to shorten a time for a cycle required to carry out injection molding.

Figure 9:
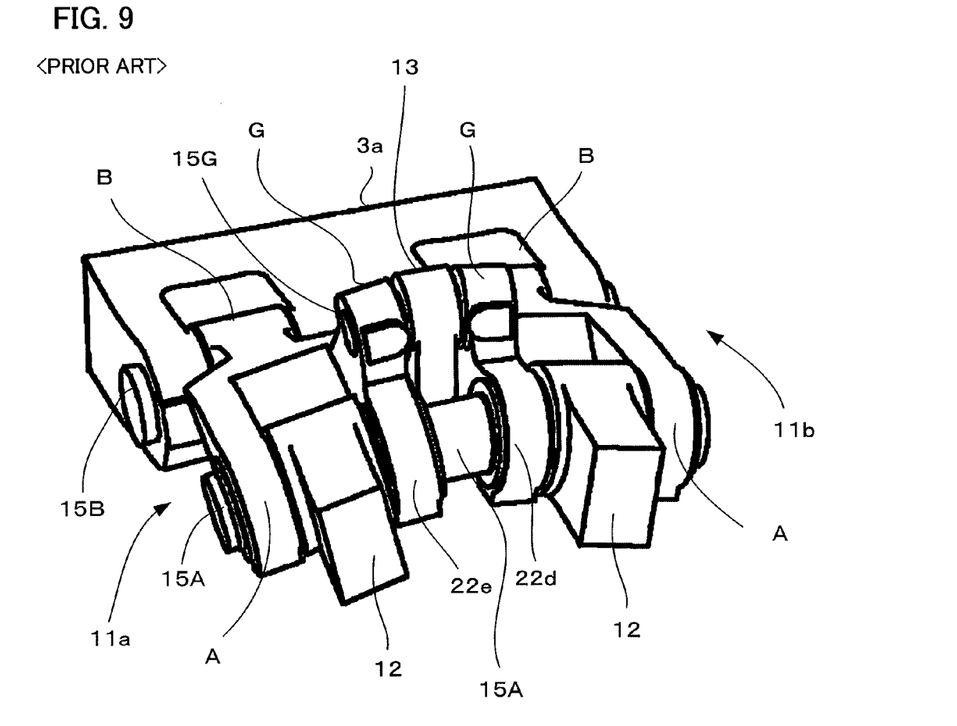
FIG. 9 is a drawing for explaining a state in which a link pin in the toggle type mold clamping device shown in FIG. 7 is deformed.

In the mold clamping device Mc described with reference to FIGS. 7 and 8, as shown on the upper side of the center line CL in a one-dot chain line shown in FIG. 8, the link pin 15G receives a load toward the outside of the mold clamping device Mc from the toggle driving link 13 at the pivot portion G of the first link 11 and the toggle driving link 13 in clamping the mold and therefore bending forces are applied on the link pin 15A and the link pin 15G. The first link 11 is divided into two in order to secure an interval through which the toggle driving links 13 passes (as shown with reference numerals 11a and 11b shown in FIG. 9) in carrying out mold closing, mold clamping, and mold opening. The first link 11 is inclined so that its center bulges as shown in FIG. 9 and therefore does not suppress bending of the link pin 15G. At this time, slips occur in a fixed portion of the link pin 15G (a portion in contact with the through hole formed in the central portion between the opposite ends of the first link 11) and a fixed portion of the link pin 15A fixed to the first link 11 and therefore the casts are likely to wear at the fixed portions.

Figure 10:
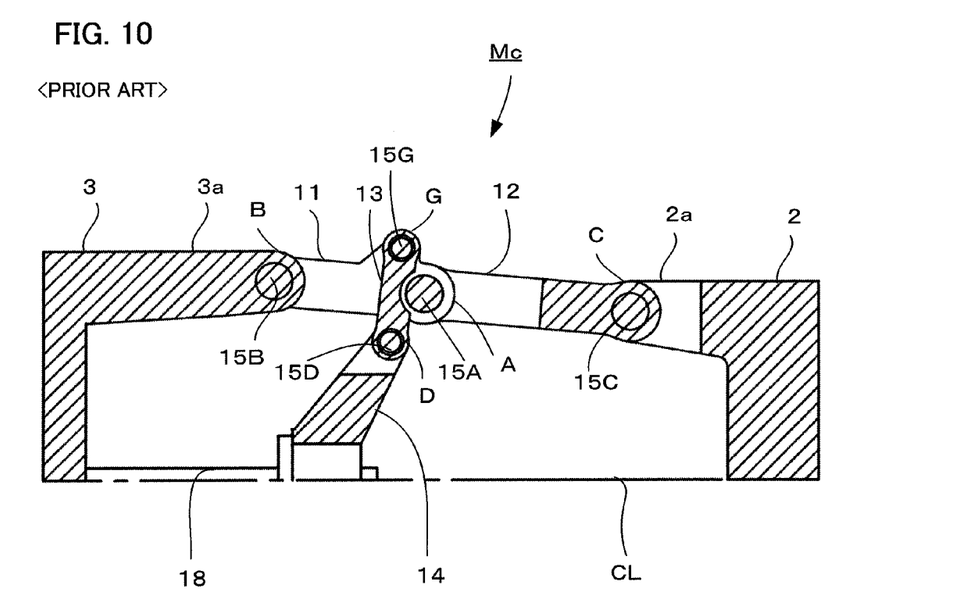
FIG. 10 is a sectional view of the toggle type mold clamping device shown in FIG. 7.

Furthermore, if the link pin 15A of the pivot portion A is inserted into the through hole 16 formed in the second link 12 in order to increase rigidity of the toggle, the toggle pin 15A restricts a movable range of the toggle driving link 13. In some cases, it is necessary to additionally form a back clearance in the toggle driving link 13 as shown in FIG. 10, which reduces strength of the toggle driving link 13.

SUMMARY OF THE INVENTION

Therefore, with the above-described problems in the prior art in view, it is an object of the present invention to provide a toggle type mold clamping device in which it is possible to reduce bending moment applied on link pins to thereby lessen bending of the link pins in closing/clamping a mold.

An injection molding machine according to the invention includes a plurality of link units each including a first link coupled to a rear platen by a first link pin, a second link coupled to a movable platen by a second link pin, and a toggle driving link coupling the first link and the second link so as to allow them to bend and having one end coupled to the first link and the other end coupled to a crosshead. A coupling portion of the first link coupled with the toggle driving link is provided on an outer side of an area between a coupling portion of the toggle driving link coupled with a crosshead 14 and a center line of the first link. The first link has a structure in which two members arranged in parallel are coupled and integrated with each other and a space through which the toggle driving link passes is formed between the two coupled members.

The two members forming the first link may be formed integrally. The first link may include a central portion in which the two members are coupled, two links provided on opposite sides of the central portion with predetermined intervals between the central portion and the two links, and coupling portions coupling the central portion and the two links.

The invention can provide the toggle type mold clamping device in which it is possible to reduce bending moment applied on link pins in closing/clamping the mold to thereby lessen bending of the link pins.

BRIEF DESCRIPTION OF THE DRAWINGS

The above and other objects and features of the present invention will become apparent from the following description of the embodiments with reference to the accompanying drawings, wherein.

DETAILED DESCRIPTION OF THE PREFERRED EMBODIMENTS

<First Embodiment>

Figure 1:
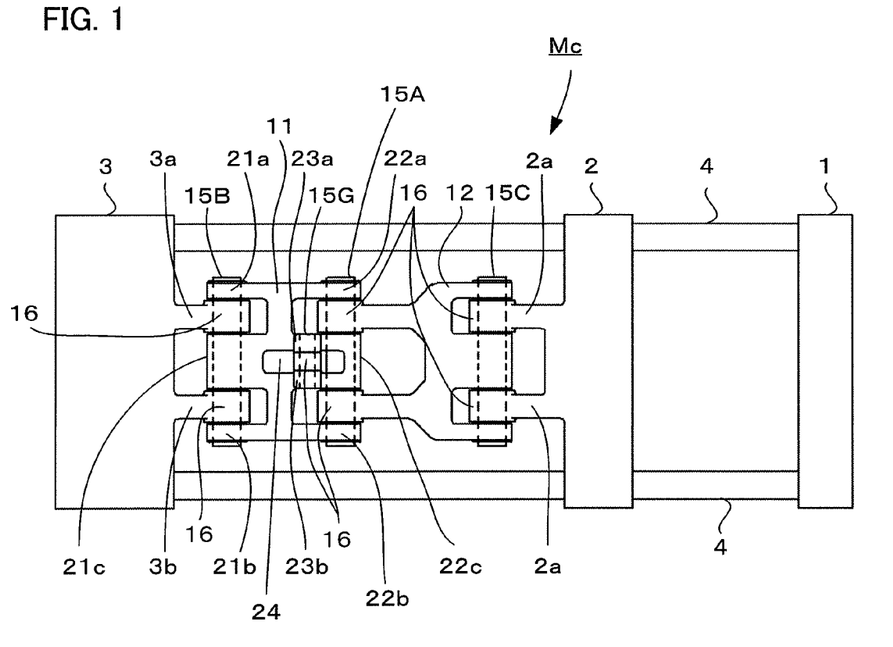
FIG. 1 is a top view of an essential portion of a first embodiment of a toggle type mold clamping device according to the invention.
Figure 2:
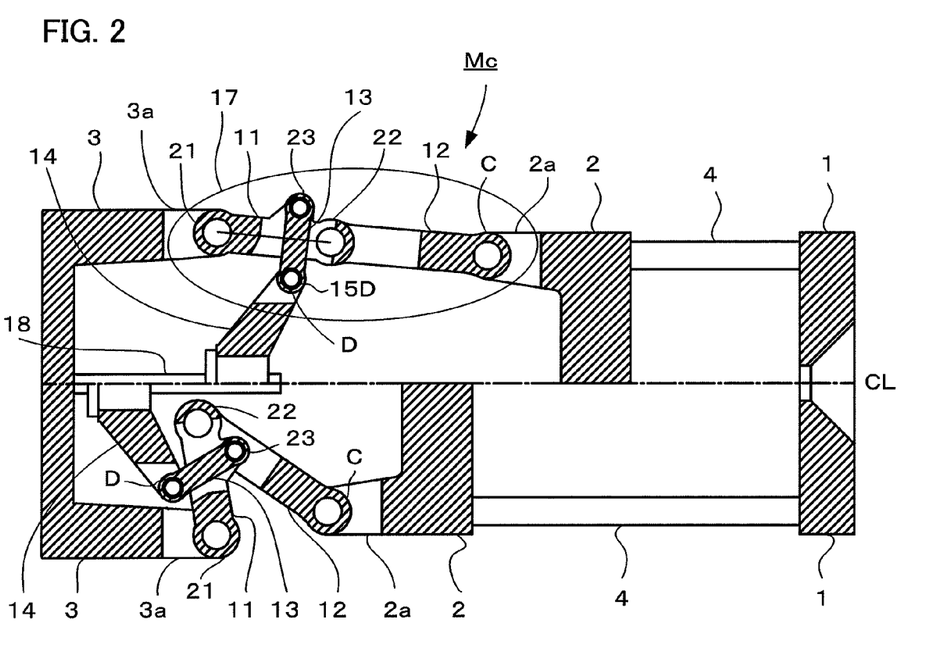
FIG. 2 is a sectional view of an essential portion of the toggle type mold clamping device shown in FIG. 1.

In an injection molding machine, a mold clamping device and an injection machine are installed in a line on a machine base in general. FIG. 1 is a top view of an essential portion of a mold clamping device Mc having link units 17 and FIG. 2 is a sectional view of an essential portion of the device Mc. FIG. 2 is a partially transparent view showing a locked-up state of the mold clamping device Mc on an upper side of a center line CL of the mold clamping device Mc and a maximum mold opening stroke of the mold clamping device Mc on a lower side of the center line CL.

The mold clamping device Mc includes a fixed platen 1, a movable platen 2, and a rear platen 3 in order to open and close a mold. The fixed platen 1 and the rear platen 3 are coupled by a plurality of tie bars 4 and the movable platen 2 moves forward and backward with respect to the fixed platen 1 along the tie bars 4. The movable platen 2 is moved forward and backward by the link units 17 of the mold clamping device Mc driven by a driving motor (not shown). Here, a set including a first link 11, a second link 12, a toggle driving link 13, link pins 15 inserted through the respective links, and bushings is referred to as the link unit 17. The mold clamping device Mc has a plurality of link units 17, e.g., one on each of the upper and lower sides.

Through holes through which the link pins 15A and 15B are inserted are respectively formed in opposite ends (one end and the other end) of the first link 11. Furthermore, another through hole is formed at an intermediate position between the through holes in the opposite ends of the first link 11. The link pin 15B is inserted through the through hole formed in the one end of the first link 11 and is fixed to the first link 11 by a locking screw or the like. The link pin 15B fixed to the first link 11 passes through the bushing inserted into the through holes 16 formed in protruding portions 3a of the rear platen 3. As a result, the first link 11 is enabled by the bushing, inserted into the through hole 16 formed in the one end of the first link 11, to rotate about a central axis of the link pin 15B, passing through the bushing, with respect to the protruding portions 3a of the rear platen 3.

A link pin 15A is inserted through the through hole formed in the other end of the first link 11 and is fixed to the other end of the first link 11 by a locking screw or the like. A through hole 16 into which the bushing is inserted is formed at one end of the second link 12. The link pin 15A inserted through the through hole formed in the other end of the first link 11 passes through the bushing inserted into the through hole 16 formed in the one end of the second link 12. As a result, the first link 11 and the second link 12 are enabled by the bushing, inserted into the through holes formed in the other end of the first link 11 and the one end of the second link 12, to rotate with respect to each other about a central axis of the link pin 15A passing through the bushing.

A through hole into which the bushing is inserted is formed in the other end of the second link 12 and a link pin 15C is inserted through the bushing and is fixed to the second link 12 by a locking screw or the like. The link pin 15C passes through the bushing inserted into through holes 16 formed in protruding portions 2a of the movable platen 2. As a result, the second link 12 is enabled by the bushing, inserted into the through hole 16 formed in the other end of the second link 12, to rotate about a central axis of the link pin 15C, passing through the bushing, with respect to the protruding portions 2a of the movable platen 2.

A through hole is formed in a crosshead 14 and a link pin 15D is inserted through the through hole and fixed to the crosshead 14 by screwing or the like. A through hole 16 into which the bushing is inserted is formed in one end of the toggle driving link 13 and the link pin 15D passes through the bushing. As a result, the toggle driving link 13 can rotate about a central axis of the link pin 15D inserted through the bushing with respect to the crosshead 14.

A link pin 15G is inserted through the through hole formed in the intermediate portion of the first link 11 and fixed to the first link 11 by a locking screw or the like. The link pin 15G passes through the bushing inserted into the through hole 16 formed in the other end of the toggle driving link 13. By inserting the bushing into the through hole 16 formed in the other end of the toggle driving link 13, the toggle driving link 13 and the first link 11 can rotate with respect to each other about a central axis of the link pin 15G passing through the bushing.

Here, portions rotating with respect to each other about the link pin 15A, the link pin 15B, the link pin 15C, the link pin 15D, and the link pin 15G as centers are referred to as a second link pivot portion 22 (22a, 22b, 22c), a first link pivot portion 21 (21a, 21b), a pivot portion C, a pivot portion D, and a toggle driving link pivot portion 23 (23a, 23b), respectively. A straight line connecting center points of the link pins 15A and 15B at the opposite ends of the first link 11 as viewed from a side is defined as a center line of the first link. By providing the toggle driving link pivot portion 23 (23a, 23b) on an outer side of an area between the center line of the first link 11 and the pivot portion D and pivotably coupling the toggle driving link 13 to the pivot portion 23, it is possible to extend a span of the toggle driving link 13 without considerably displacing the link unit 17 outward away from the crosshead 14 to thereby increase a mold clamping force and prevent increase in a vertical width of the mold clamping device Mc. By providing the pivot portion 23 of the first link 11 and the toggle driving link 13 on the outer side, it is possible to shorten a moving distance of the crosshead 14 required to move the movable platen 2 a certain distance to shorten a time for a cycle required to carry out injection molding.

Figure 3:
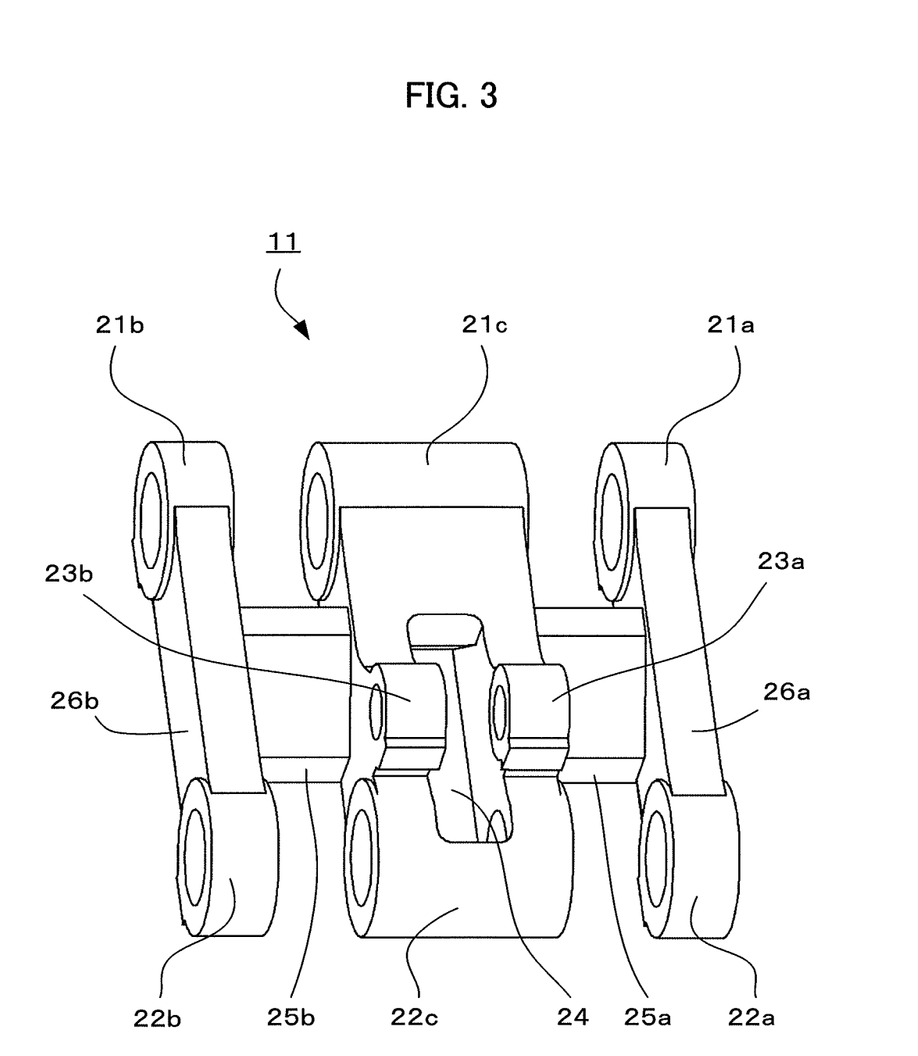
FIG. 3 is an external perspective view of a first link used in the toggle type mold clamping device shown in FIG. 1.

FIG. 3 is an external perspective view of the first link 11. The first link 11 includes the first link pivot portion 21, the second link pivot portion 22, the toggle driving link pivot portion 23, and a toggle driving link through hole 24. The first link 11 includes a central portion having the toggle driving link pivot portion 23, coupling portions 25a and 25b, and side links 26a and 26b coupled to the central portion with certain intervals between the central portion and the side links 26a and 26b by means of the coupling portions 25a and 25b. The side link 26a includes the first link pivot portion 21a and the second link pivot portion 22a. The side link 26b includes the first link pivot portion 21b and the second link pivot portion 22b.

The toggle driving link 13 passes through the through hole 24 in the first link 11 and has one end pivotably coupled to the first link 11. On the other hand, the other end of the toggle driving link 13 is pivotably coupled to the crosshead 14. By forming the first link 11 as an integral body, it is possible to prevent bending of the link pin 15A and the link pin 15G, inserted through the through holes in the first link 11 and mounted to the first link 11, due to forces received from the toggle driving link 13 in generating a mold clamping force to thereby prevent deformation of the first link 11 in an inclining manner.

If the stroke is increased in mold opening, the toggle driving link pivot portion 23 of the first link 11 which is the pivot portion between the toggle driving link 13 and the first link 11 comes inside the second link 12. Therefore, the pivot portion between the second link 12 and the first link 11 is bifurcated. The pivot portion 22 between the first link 11 and the second link 12 is separated into three portions in total, i.e., the central portion 22c having the through hole 24 through which the toggle driving link 13 passes and the two portions 22a and 22b positioned outside the bifurcated pivot portion of the second link 12. If the pivot portion 21 (21a, 21b, 21c) of the first link 11 on the side of the rear platen 3 is bifurcated, it is difficult to secure a coupling portion in an area between the through hole 24 and the bifurcated portion. Therefore, the pivot portion 21 on the side of the rear platen 3 is preferably trifurcated.

Figure 4:
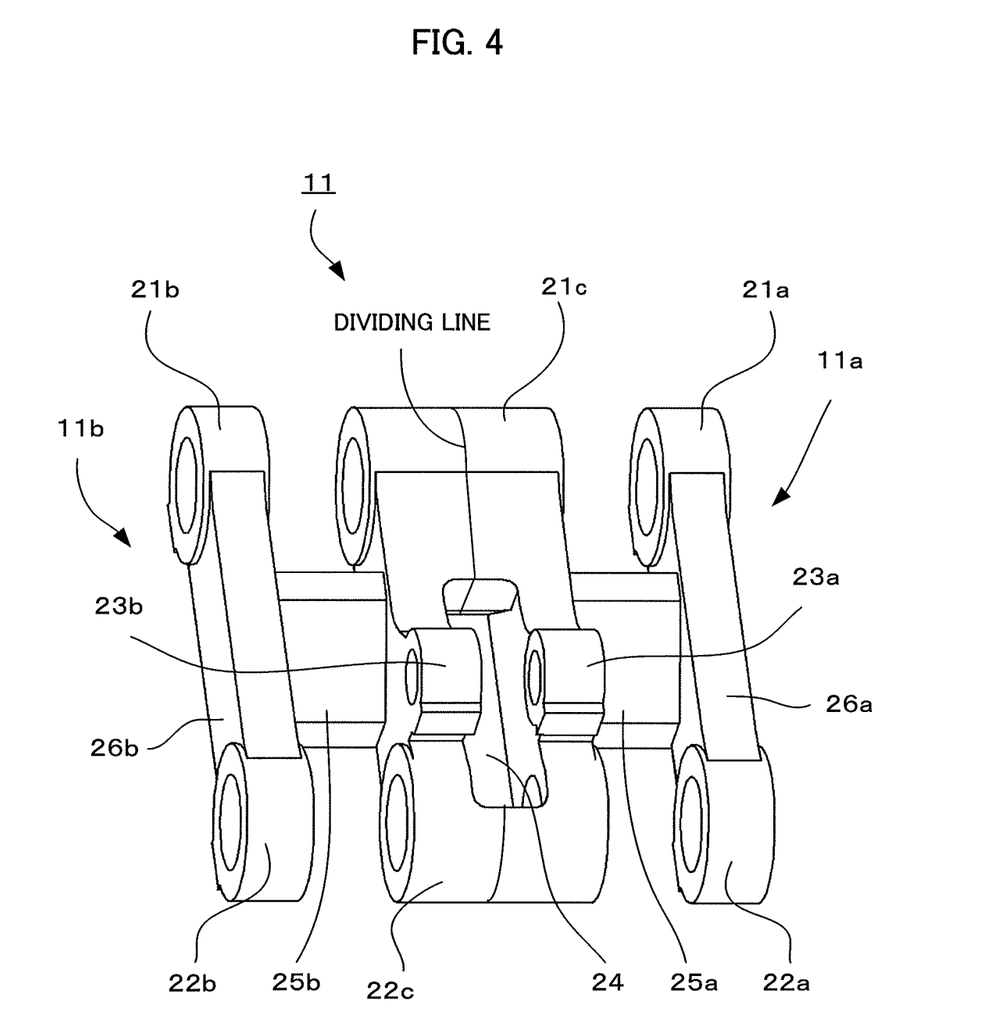
FIG. 4 is an external perspective view of the first link, used in the toggle type mold clamping device shown in FIG. 1, composed of two members.

FIG. 4 is an external perspective view of the first link, used in the first embodiment of the mold clamping device according to the invention, composed of two members. The first link 11 is divided into the two members 11a and 11b by a dividing line shown in FIG. 4 and the members 11a and the member 11b are coupled to each other by using coupling members such as bolts.

<Second Embodiment>

If the central toggle pin is inserted to increase rigidity of the toggle, in the prior art, the central toggle pin 15A restricts the movable range of the toggle driving link 13 as shown in FIG. 10 and a back clearance such as a notch needs to be formed additionally in the toggle driving link 13 in some cases, which may reduce strength of the toggle driving link.

Figure 5A:
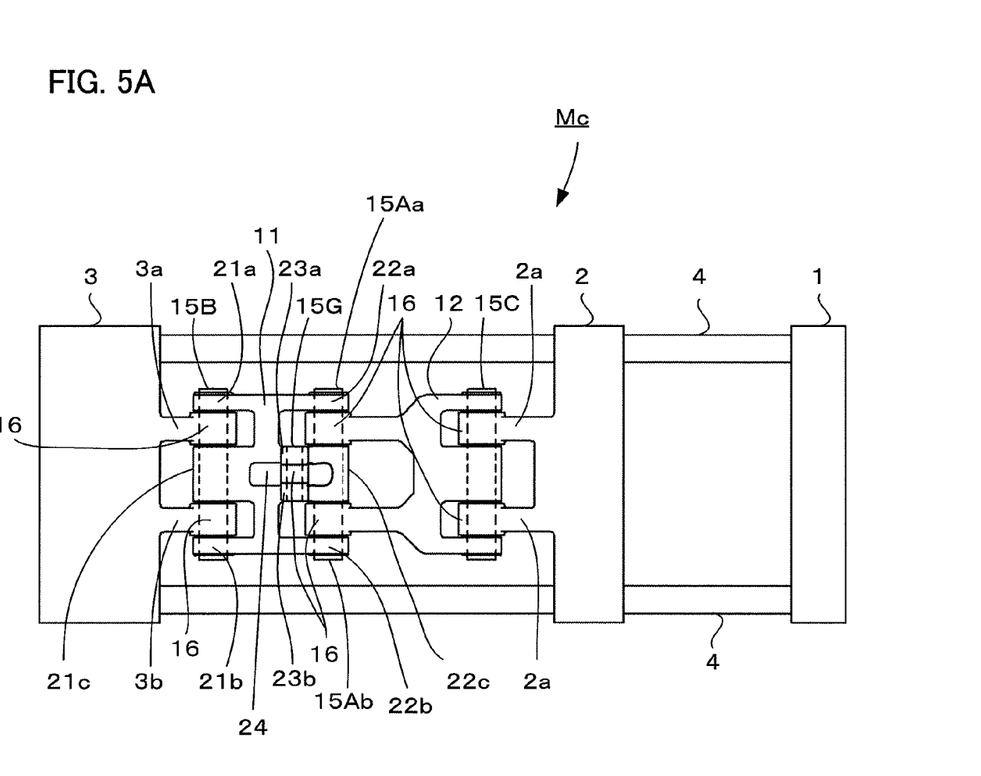
FIG. 5A is a top view of an essential portion of a second embodiment of the toggle type mold clamping device according to the invention.
Figure 5B:
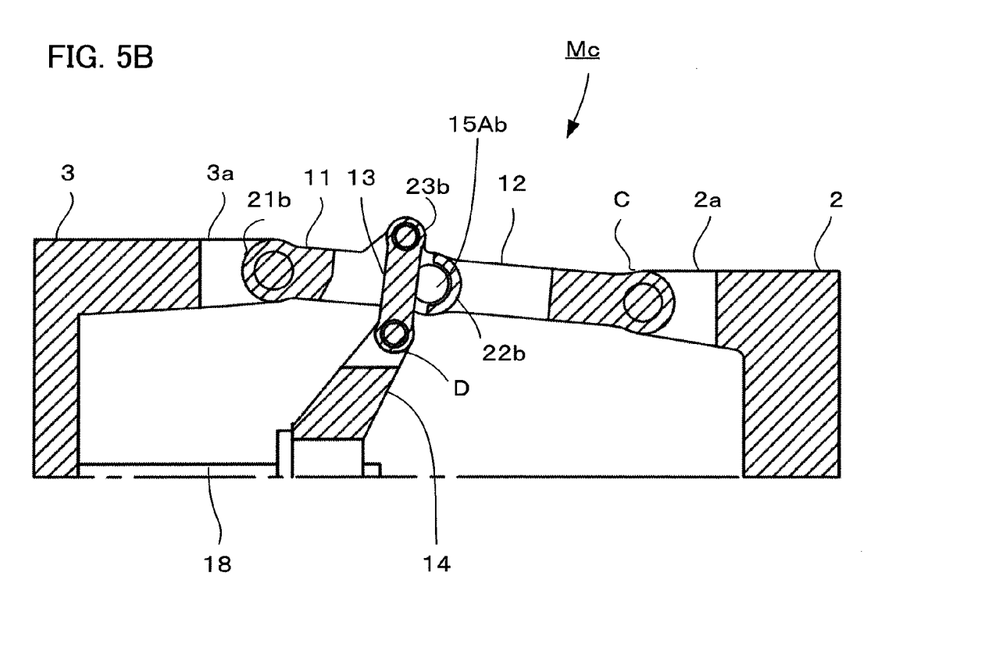
FIG. 5B is a sectional view of an essential portion of the toggle type mold clamping device shown in FIG. 5A.

In the second embodiment of the invention, the casts are coupled and the rigidity can be secured even if the central toggle pin 15A is divided as shown in FIGS. 5A and 5B. Therefore, by dividing the central toggle pin 15A into the two members 15Aa and 15Ab, it is possible to expand the movable range of the toggle driving link 13 in the mold opening and closing operations of the mold clamping device Mc.

<Third Embodiment>

Figure 6A:
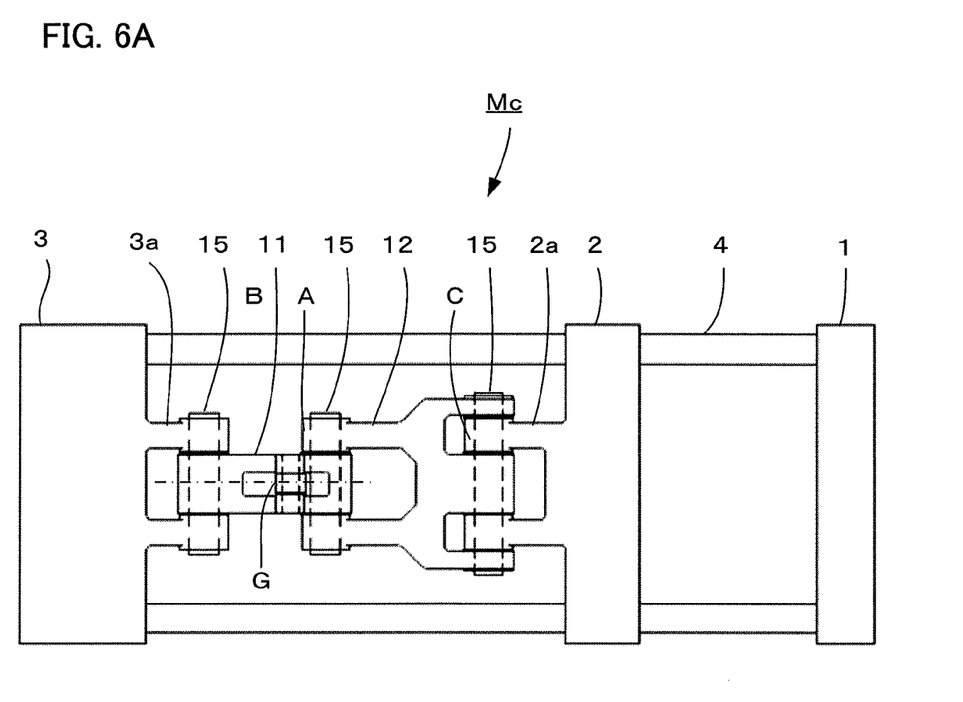
FIG. 6A is a top view of an essential portion of a third embodiment of the toggle type mold clamping device according to the invention.
Figure 6B:
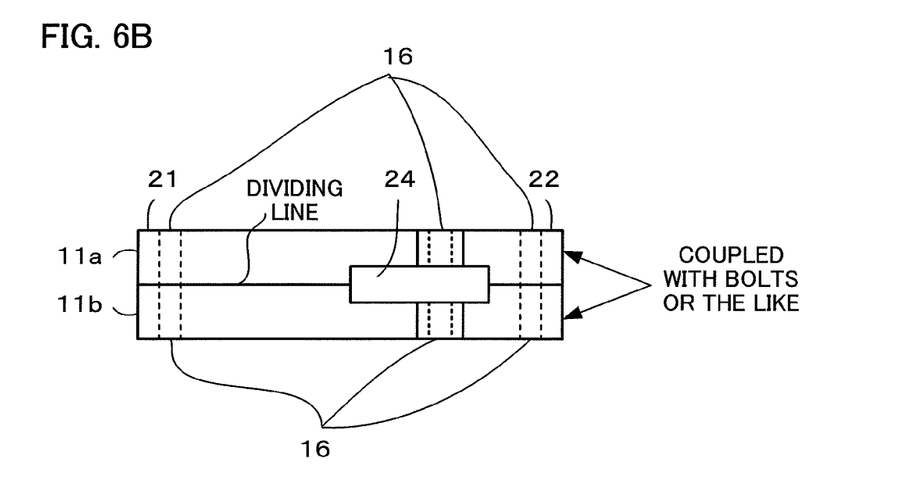
FIG. 6B is a top view of a first link in the toggle type mold clamping device shown in FIG. 6A.

FIGS. 6A and 6B are a top view of a mold clamping device in a third embodiment according to the invention and a top view of the first link. The third embodiment has a structure including only the central portion of the first link 11. The first link 11 used in the third embodiment includes two members 11a and 11b and the two members are coupled to each other by coupling members such as bolts. The first link 11 used in the third embodiment includes only the central portion and is easy to manufacture. In the second embodiment, bending forces are more likely to be applied on the central toggle pins 15A and 15G than in the first embodiment.

The invention claimed is:

1. A toggle mold clamping device for an injection molding machine comprising a plurality of link units each including a first link coupled to a rear platen by a first link pin, a second link coupled to a movable platen by a second link pin, and a toggle driving link coupling the first link and the second link to allow the first link and the second link to bend and having one end coupled to the first link and the other end coupled to a crosshead, wherein a coupling portion of the first link coupled with the toggle driving link is provided on an outer side of an area between a coupling portion of the toggle driving link coupled with the crosshead and a center line of the first link, and the first link has a structure in which two members arranged in parallel are coupled and integrated with each other and a through hole through which the toggle driving link passes is formed between the two coupled members.

2. The toggle mold clamping device according to claim 1, wherein the two members forming the first link are formed integrally.

3. The toggle mold clamping device according to claim 1, wherein the first link includes a central portion in which the two members are coupled, two links provided on opposite sides of the central portion with predetermined intervals between the central portion and the two links, and coupling portions coupling the central portion and the two links.

4. A toggle mold clamping device for an injection molding machine comprising a plurality of link units each including a first link coupled to a rear platen by a first link pin, a second link coupled to a movable platen by a second link pin, and a toggle driving link coupling the first link and the second link to allow the first link and the second link to bend and having a first end coupled to the first link and a second end coupled to a crosshead, wherein a coupling portion of the first link coupled with the toggle driving link is provided on an outer side of an area between a coupling portion of the toggle driving link coupled with the crosshead and a center line of the first link, the first link has a structure in which two members arranged in parallel are coupled and integrated with each other and a space through which the toggle driving link passes is formed between the two coupled members, and the first link includes a central portion in which the two members are coupled, two links provided on opposite sides of the central portion with predetermined intervals between the central portion and the two links, and coupling portions coupling the central portion and the two links.

\* \* \* \* \*